J. T. CODY.
Metallic Neck for Glass Vessel.
No. 199,264. Patented Jan. 15, 1878.
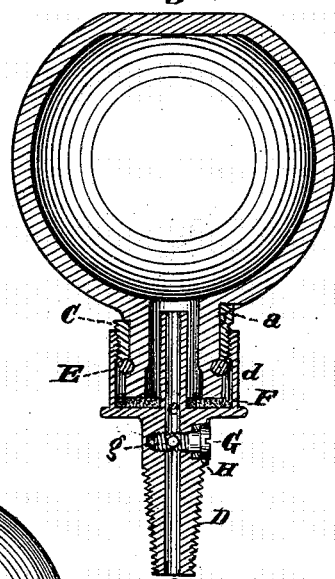
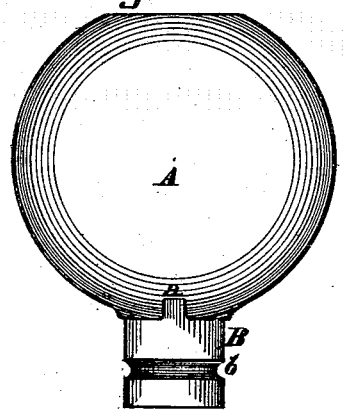
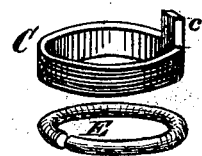

UNITED STATES PATENT OFFICE.

JOHN T. CODY, OF CINCINNATI, OHIO.

IMPROVEMENT IN METALLIC NECKS FOR GLASS VESSELS.

Specification forming part of Letters Patent No. 199,264, dated January 15, 1878; application filed October 17, 1877.

*To all whom it may concern:*

Be it known that I, JOHN T. CODY, of Cincinnati, Hamilton county, State of Ohio, have invented an Improvement in Lubricators and Metallic Necks for Glass Vessels in general, of which the following is a specification:

My invention relates, in the first part, to means for connecting the metallic neck to the glass globe of a lubricator, or glass vessel for other use, and, in the second part, to means for regulating the flow of oil or other fluid therefrom.

My invention consists, in the first part, in the combination, with a glass vessel having a neck with a circular groove formed therein, and a notch or notches near the shell of the vessel, of a metallic ring with a screw-thread upon its exterior surface, and a projection or projections to fit the notch or notches of the glass vessel, and a split ring adapted to fit the circular groove in the neck of the vessel to hold the metallic screw-threaded ring in place, the whole forming a base having an exterior metallic thread, to which the metallic neck or hollow discharging-stem of the vessel may be attached.

My invention consists, in the second part, in connection with the discharge-aperture of the metallic neck of the vessel, of a headed screw whose shank is perforated, and whose head is formed with a notch for a screw-driver, an elastic gasket being introduced between the head of the screw and its chamber to make a tight joint, and to permit the rotation of the screw to adjust the flow of oil or other fluid without creating a leakage in the joint.

In the accompanying drawing, Figure 1 is a vertical section of a lubricator embodying my improvements. Fig. 2 is an exterior view of a glass vessel suitable for a lubricator; and Fig. 3 is a perspective view of the metallic ring with screw-thread upon it, and the split ring for holding it in place.

A is the glass vessel, in this case adapted for a lubricator, the neck formed thereon being of the same material. In the vessel A, at its junction with the neck, I form a notch or notches, $a$, and in the neck B, which is cylindrical, I form a circular groove, $b$. To the cylindrical neck B, I fit a metallic ring, C, whose exterior surface is screw-threaded, in the manner shown in Figs. 1 and 3. On the side of this metallic ring I provide a projection or projections, $c$, adapted to fit the notch or notches $a$, so that when the ring C is in place the projection or projections $c$, fitting the notch or notches $a$, will prevent the rotation of the ring C, and thus enable the ring C to become a fixed base, to which the stem D may be attached, the said stem D having a socket, $d$, screw-threaded interiorly to match the screw upon the ring C.

To keep the ring C from pulling off in the operation of screwing on the stem D, I place the split ring E in the groove $b$, in the manner shown in Fig. 1, the ring being split to permit it to open sufficiently to pass over the neck, and to enable it to close together again in the groove $b$. When in place in the groove $b$ the ring E serves to retain the ring C in place.

Between the stem D and the end of the neck B, I place the usual gasket F.

Across the aperture $e$ of the stem D, I insert a screw, G, having a head cut across for a screw-driver, and a screw-threaded shank, having a perforation, $g$, through which the oil or other fluid passes. Between the head of this screw and the bottom of the socket, in which it fits, I place a gasket, H, preferably of the material known to the trade as "vulcanized fiber." It has a certain elasticity about it which, while it permits the screw to be turned sufficiently to regulate the amount of flow through the aperture $g$, makes it stiff enough to form a stout base for the head of the screw, and has no tendency to soften under the action of the oil. The head of the screw rests entirely in a counterbore in the neck, and therefore has no projection.

By reason of the notch for the use of a screw-driver being provided in place of any other means to adjust this screw, and the head having no projection, all tampering with the adjustment is prevented, it being unusual for parties likely to change the adjustment to carry any tool adapted to turn this screw. This screw, furthermore, is a cheap and effective way of giving niceties of adjustment to the flow of fluid from the cup or vessel, the relation between the line of the aperture $g$ and the line of the aperture $e$ determining the amount which is permitted to flow from the cup, and the notch in the head forming a good index to facilitate adjustment.

I claim—

1. The combination of the glass vessel A, having one or more recesses or notches, $a$, and a circular groove, $b$, the metallic screw-threaded collar C, having one or more projections, $c$, to fit said notch or notches, and the split ring E, constructed and operating substantially as and for the purpose specified.

2. In combination with the perforated stem D of the vessel, the adjusting-screw G, having an aperture, $g$, a sunken screw-driver head, and an elastic gasket, H, under the same, substantially as and for the purpose specified.

In testimony of which invention I hereunto set my hand.

JOHN T. CODY.

Witnesses:
JOHN E. JONES,
J. L. WARTMANN.